(12) United States Patent
West, Jr.

(10) Patent No.: US 7,978,977 B2
(45) Date of Patent: Jul. 12, 2011

(54) FRONTEND BASEBAND DIGITAL REVERSE FOR A CABLE MODEM TERMINATION SYSTEM

(76) Inventor: Lamar E. West, Jr., Maysville, GA (US)

( * ) Notice: Subject to any disclaimer, the term of this patent is extended or adjusted under 35 U.S.C. 154(b) by 1375 days.

(21) Appl. No.: 11/426,725

(22) Filed: Jun. 27, 2006

(65) Prior Publication Data

US 2007/0297748 A1    Dec. 27, 2007

(51) Int. Cl.
*H04J 14/00* (2006.01)
(52) U.S. Cl. .................... 398/72; 398/71; 398/76
(58) Field of Classification Search ............ 398/58, 398/66–68, 70–72, 76, 115
See application file for complete search history.

(56) References Cited

U.S. PATENT DOCUMENTS

| 5,606,725 | A | 2/1997 | Hart |
| 7,580,630 | B2 * | 8/2009 | Kee et al. ............... 398/25 |
| 2002/0144292 | A1 | 10/2002 | Uemura et al. |
| 2004/0165889 | A1 * | 8/2004 | Mahony et al. ............ 398/71 |

FOREIGN PATENT DOCUMENTS

EP    0 821 527 A2    1/1998

* cited by examiner

*Primary Examiner* — Dalzid Singh
(74) *Attorney, Agent, or Firm* — Tarolli, Sundheim, Covell & Tummino LLP

(57) ABSTRACT

The present invention is directed towards monitoring and adjusting a power level of reverse subcarrier signals at an input of an optical node as opposed to at an input of a CMTS blade. Advantageously, reverse subcarrier signals are digitally transmitted throughout the optical link thereby avoiding the use of attenuators in the optical link. Therefore, any attenuation of the power level of the reverse subcarrier signals is caused by an RF feeder portion of the communications system. The CMTS blade then detects the power level of the reverse subcarrier signal that is equivalent to the power level at the input of an optical node and sends a control signal to CPE adjusting the transmitter power level without affecting the optical node dynamic range.

13 Claims, 10 Drawing Sheets

FRONTEND BASEBAND DIGITAL REVERSE FOR A CABLE MODEM TERMINATION SYSTEM

TECHNICAL FIELD

The present invention is generally related to a communications system and, more particularly, is related to systems and methods for improving control and monitoring of the radio frequency (RF) power level in a reverse path of the communications system.

BACKGROUND OF THE INVENTION

Hybrid fiber/coaxial (HFC) communications systems transmit signals in a forward and reverse path between a headend and a plurality of subscribers. In the reverse path, a coaxial cable feeder portion connects the subscriber equipment (i.e., customer premise equipment (CPE)), with an optical node, which converts the radio frequency (RF) signals received from the CPE to optical signals, that sits at the input of an optical link. Subsequently, the optical link connects the reverse path from the optical node to a hub or headend. Typically, a cable modem termination system (CMTS) located in the hub or headend receives the reverse signals and processes them accordingly.

There is a significant variability and uncertainty in reverse signal loss in the coaxial feeder portion of the system between various subscriber locations and the input to the optical link. The resulting RF subcarrier level uncertainty can then cause a dynamic control overdrive or underdrive condition of the optical link. Unfortunately, the actual dynamic control of the level of these RF subcarriers is mostly done at the input of a CMTS blade, which is at the far end of the reverse path (i.e., in the hub or headend) and is typically referred to as long-loop automatic gain control (AGC), by sending a control signal commanding the CPE to increase or decrease the power level of the RF subcarrier signals. Therefore, there is a need to shift the control and the monitoring of the level of reverse RF subcarriers from the CMTS blade closer to the input of the optical link where these levels are most critical.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

The preferred embodiments of the invention now will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. Furthermore, all "examples" given herein are intended to be non-limiting.

The present invention is directed towards the enablement of moving the control and monitoring of reverse RF subcarrier signals prior to the input of an optical link. Advantageously, the present invention allows a CMTS to sense the level of the RF subcarriers directly received at the input of an optical node. This allows accurate sensing and subsequent control of the level of the RF subcarriers and uses the available system dynamic range of the optical link far more efficiently than the conventional approach, which is to control the RF subcarriers using a long loop AGC at the CMTS input. Additionally, required attenuators used throughout the optical link and the headend are no longer necessary since the RF subcarriers are transmitted throughout the system in the digital domain as opposed to the conventional analog domain. Transmitting the RF subcarriers in the digital domain also allows for digital summing in the headend. A brief overview of a communications system is addressed hereinbelow.

Figure 1:
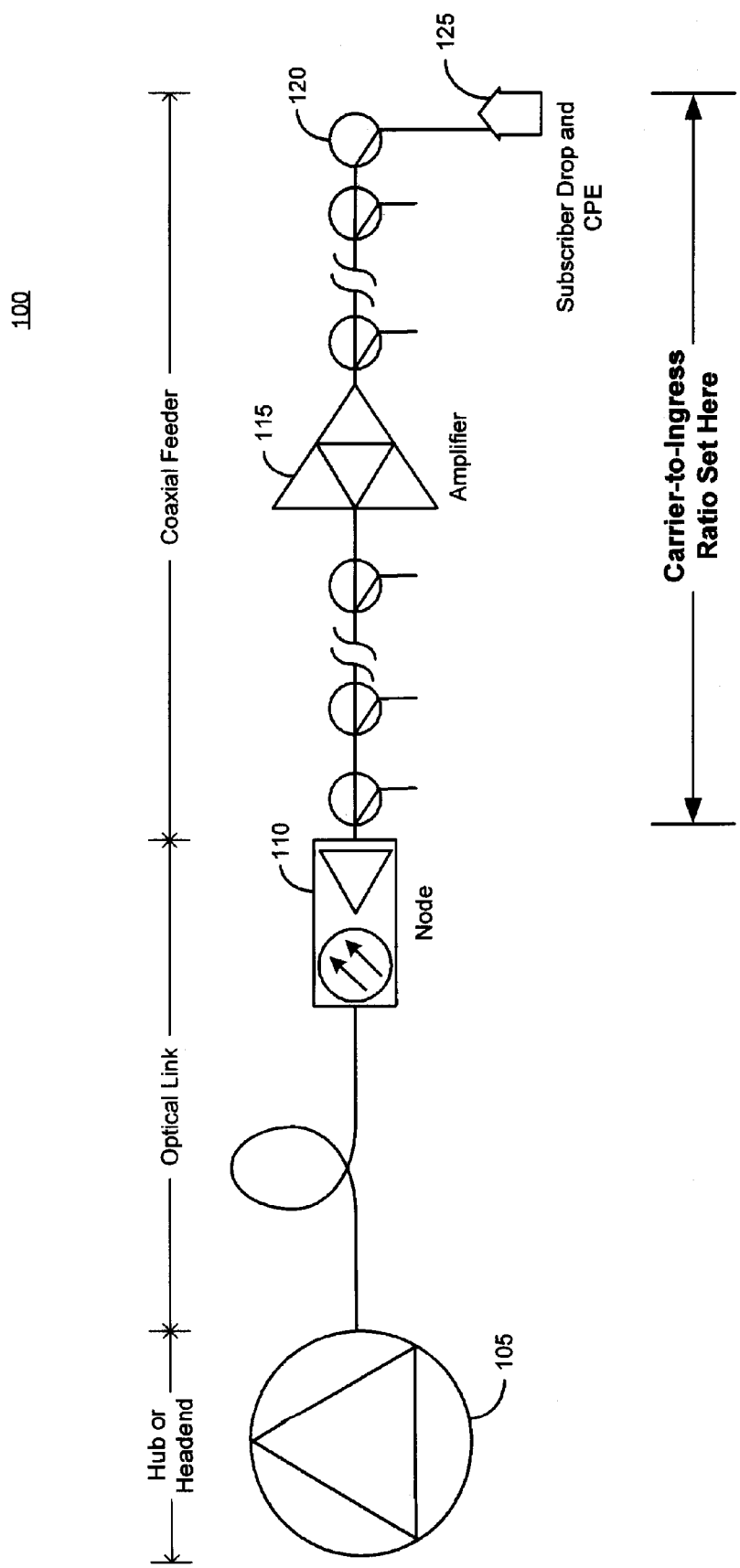
FIG. 1 illustrates a block diagram of one link in an HFC communications system.

FIG. 1 illustrates a block diagram of one link 100 in an HFC communications system. A headend or hub 105 receives and generates signals, such as video, voice, and data signals, and transmits them over an optical link to an optical node 110. The optical node 110 converts the optical signals into electrical signals for further transmission through a coaxial feeder portion of the link 100. Amplifiers 115 amplify the signals as necessary and taps 120 split the signal for distribution to customer premise equipment (CPE) 125. The CPE 125 receives the forward signals as well as transmits reverse RF subcarrier signals upstream through the link 100. It will be appreciated that only one link 100 is shown for illustration purposes, but there are typically several links in a communications system. Each link can be designed independently depending upon the number of subscribers, the total distance of the subscribers from the headend, and the amount of losses in the cable feeder portion of the link 100, to name but a few.

Figure 2:
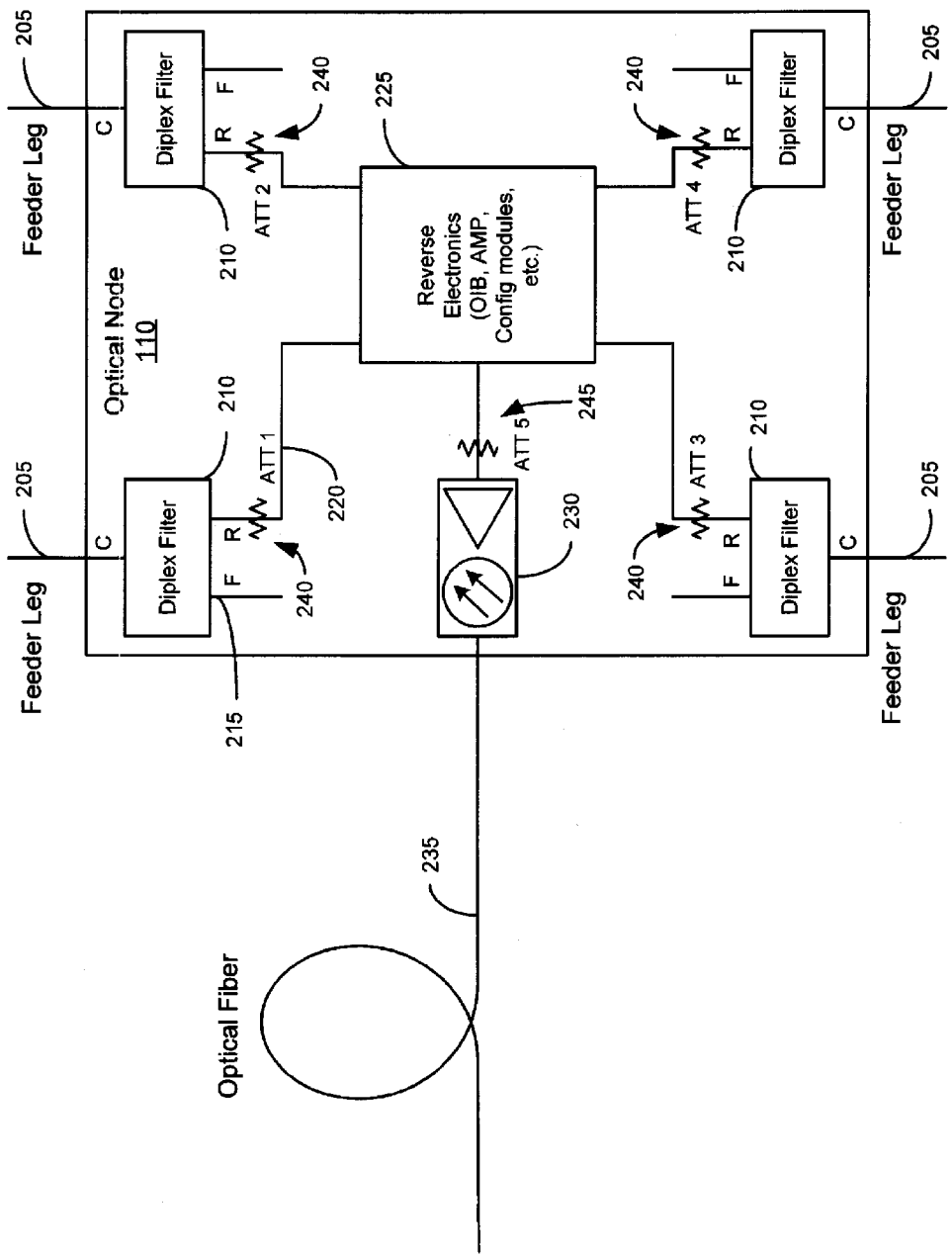
FIG. 2 illustrates a simplified block diagram of an optical node that is suitable for use in the link of FIG. 1.

FIG. 2 illustrates a simplified block diagram of an optical node 110 that is suitable for use in the link 100 of FIG. 1. As shown in this example there are four feeder legs 205 that transmit and receive electrical signals with a different coaxial feeder portion of the link. Both the forward and reverse signals are transmitted via the feeder leg 205 with a diplex filter 210. Each diplex filter 210 includes filters that separate the forward and reverse signals. More specifically, the forward signals are typically filtered in a range from 45 Mega Hertz (MHz) up to 1 Giga Hertz (GHz) and the reverse signals are typically filtered in a range from 5 MHz to 40 MHz. In this manner, forward signals are received from optical fiber 235 on a forward input port 215 and reverse signals are transmitted from a reverse output port 220 of each diplex filter 210.

Focusing on the reverse path, the reverse RF subcarrier signals are filtered and routed to reverse electronics 225, which may include amplifiers, configuration modules, etc. Reverse electronics 225 may also include an analog-to-digital (A/D) converter for converting the RF analog signals into RF digital signals. Reverse analog or digital signals are then converted into optical signals by a reverse transmitter 230. The reverse optical signals are then transmitted further upstream via the optical fiber 235. Generally, the reverse transmitter 230 of the optical node 110 is always transmitting reverse signals, which may or may not include reverse RF subcarrier signals, but generally always include ingress signals. Since ingress signals are cumulative in nature, they are transmitted upstream in each coaxial feeder portion and are funneled into the optical node 110 where the ingress signals from each feeder leg 205 is added and transmitted to headend equipment.

Feeder leg attenuators 240 (i.e., ATTs 1-4) are used to equalize the levels of the RF subcarrier signals coming from each of the four feeder legs 205. Typically, technicians choose the most suitable value attenuator for each feeder leg 205 while installing the optical node in the system. This is generally accomplished by inserting values until a desired outcome is received. A reverse transmitter attenuator 245 (i.e., ATT 5) is used to set the drive level of the reverse signals into the reverse transmitter 230. The transmitter drive level is determined based on optical link noise and optical link distortion while still remaining within the dynamic range of the optical link. Determining the value of the reverse transmitter attenuator 245, however, is more difficult and is based on how the plurality of CPE on that link is loading the reverse path.

Figure 3:
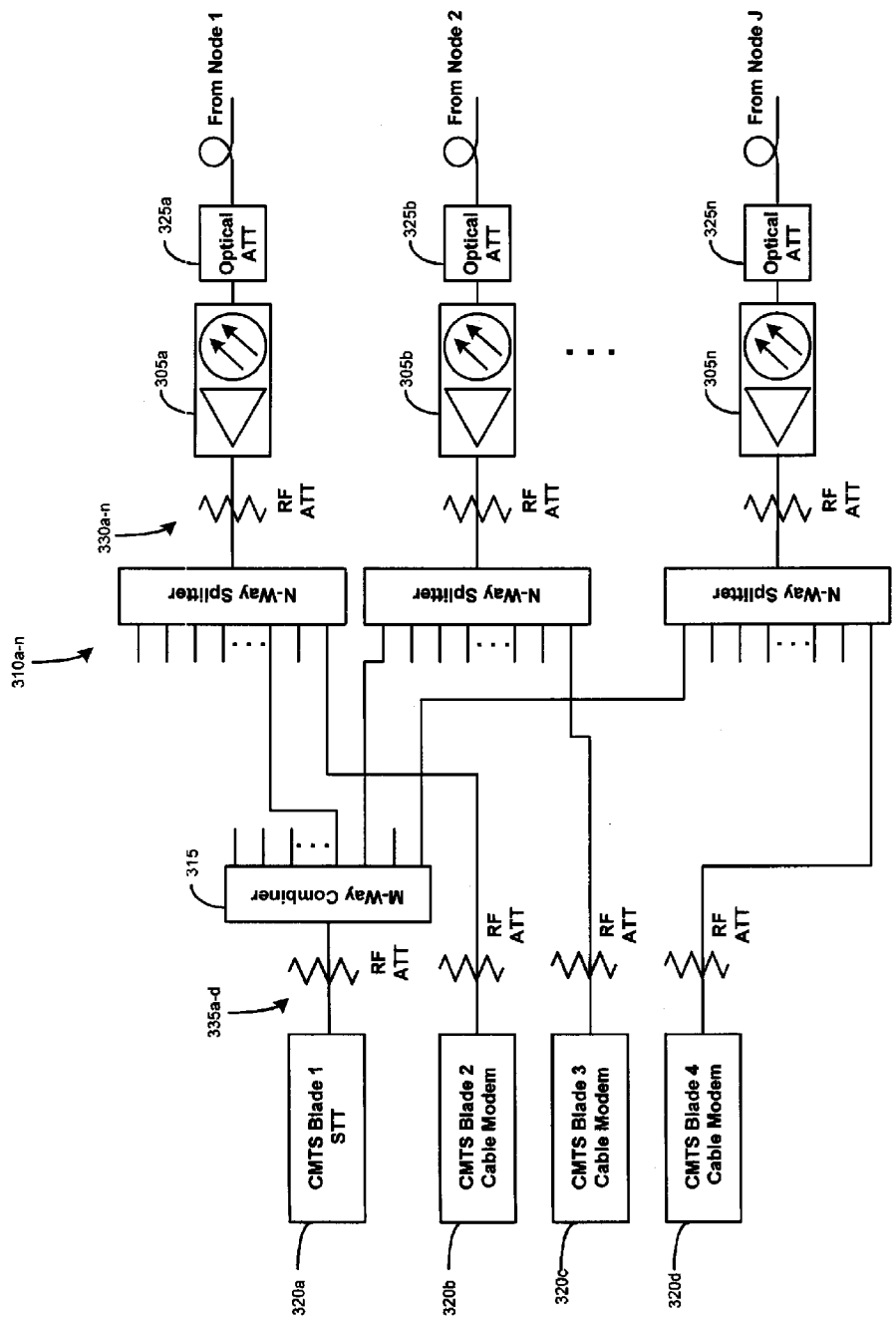
FIG. 3 illustrates a simplified headend/hub and reverse optical link design that is suitable for use in the link of FIG. 1.

FIG. 3 illustrates a simplified headend/hub and reverse optical link design that is suitable for use in the link of FIG. 1. Optical signals are received at an optical receiver 305a-n from an optical node, such as the optical node 110 of FIG. 2. The optical signals are converted into electrical signals and, via a digital-to-analog (D/A) converter, if necessary, converted back into analog signals. In some cases, the received optical signals may not have been digitized by the optical node 110 and therefore do not need to be converted into analog signals. The electrical analog signals are then split via an n-way splitter 310a-n according to signal type or header address in a known manner. Like or common reverse electrical signals from each link are then combined, if necessary, via an n-way combiner 315 in order to provide a single reverse stream from each optical receiver 305a-n to an appropriate CMTS blade 320a-d. At the input of each CMTS blade 320a-d, an internal A/D converter receives the analog signals and converts the signals to digital signals for further processing.

Optical attenuators 325a-n at the input and RF attenuators 330a-n at the output of each of the optical receivers 305a-n are used to equalize the RF levels of the reverse subcarrier signals that are received from different optical nodes. Additionally, RF attenuators 335a-d are used at the input of the CMTS blade 320a-d to adjust the RF subcarrier level at the output of the splitting and combining networks 310, 315 to match a required nominal input level for each CMTS blade 320a-d.

Referring to FIG. 1 in conjunction with FIG. 3, each CMTS blade 320a-d in the headend 105 monitors the reverse subcarrier amplitude at the CMTS blade input and, in order to maintain a constant level, each CMTS blade 320a-d attempts to adjusts a power level of a transmitter included in the CPE 125 (i.e., long loop AGC). More specifically, if the subcarrier amplitude drifts outside a preset window (e.g., −5 dBmV to +5 dBmV), a command is sent downstream to adjust the transmit power level in the affected CPE. Since levels drift relatively little in the optical link, the drift is mainly set by the coaxial feeder portion where most of the ingress comes from the subscriber's drop to the CPE. Therefore, the subcarrier amplitude adjustment is predominantly intended to compensate for the variability in the loss from the coaxial feeder portion of the link 100 in order to keep the optical node 110 and headend or hub 105 operating at the nominal level.

Figure 4:
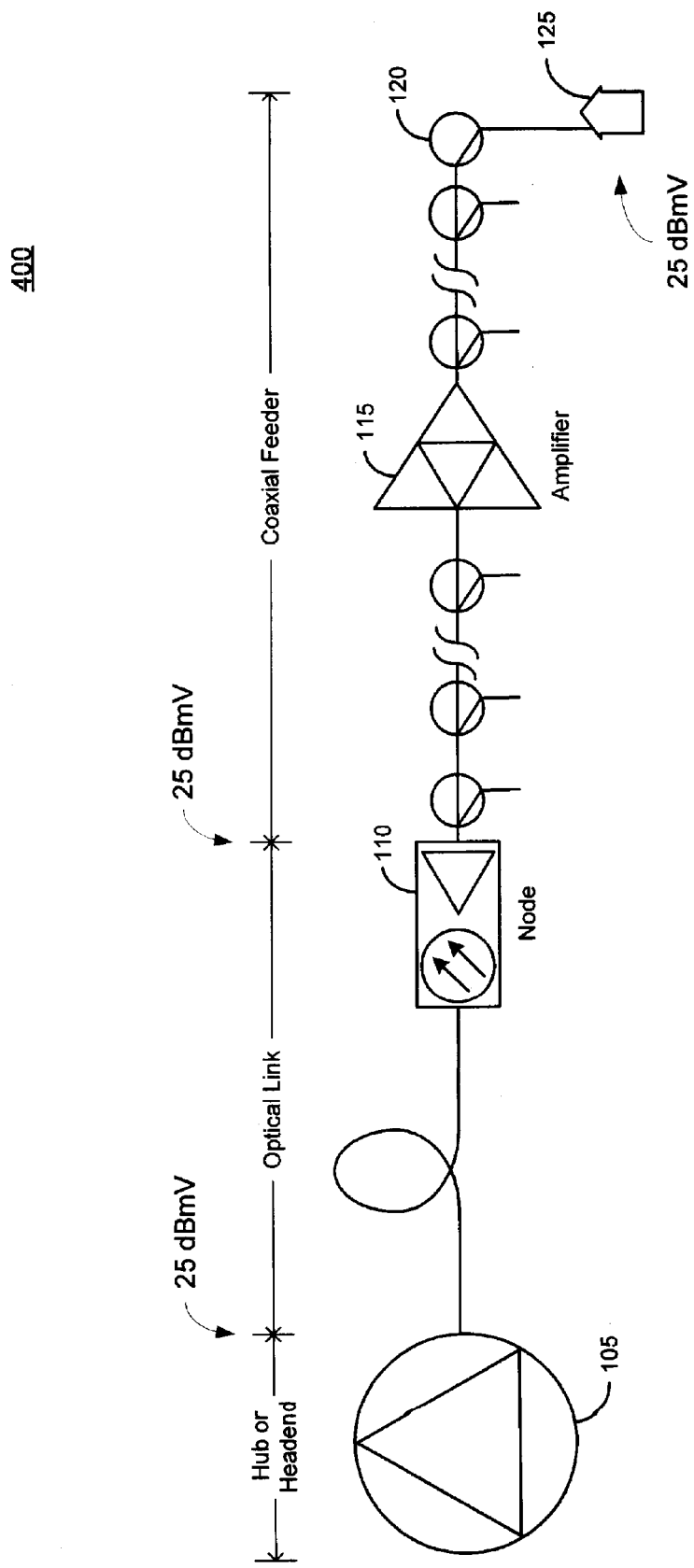
FIG. 4 illustrates a simplified block diagram of a system link 400 that is currently transmitting reverse subcarrier signals having an acceptable RF power level.

FIG. 4 illustrates a simplified block diagram of a system link 400 that is currently transmitting reverse subcarrier signals having an acceptable RF power level. At the headend 105, the CMTS blade 320a-n receives a reverse subcarrier signal having a power level of 25 dBmV, which is an acceptable power level for the system. The CMTS blade 320a-n then assumes that the power level at the input of the optical node 110 is 25 dBmV and that the transmitter of the CPE 125 is transmitting the reverse subcarrier signal at 25 dBmV. It will be appreciated that the power levels from the CPE and at the optical node may vary from 25 dBmV, but that the various attenuators throughout the link 400 are correctly adjusting the signal level.

Figure 5:
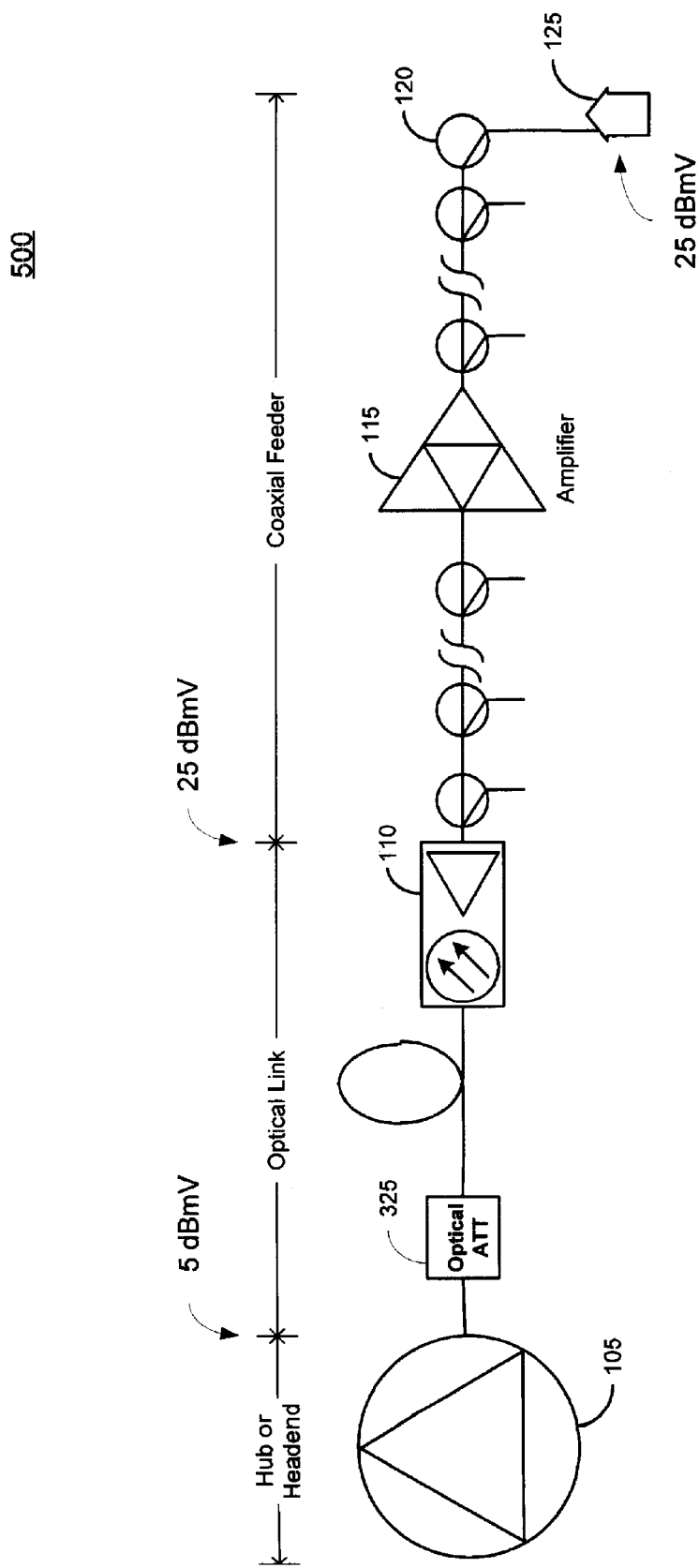
FIG. 5 illustrates a simplified block diagram of a system link 500 that is attenuating the power level of the reverse subcarrier signal.

FIG. 5 illustrates a simplified block diagram of a system link 500 that is attenuating the power level of the reverse subcarrier signal. During maintenance work, for example, a technician may insert a 20 dB optical attenuator 325 into the optical link 500. Assuming that the transmitter power level and the power level at the input of the optical node 110 remains as in FIG. 4 at 25 dBmV, the 20 dB optical attenuator 325 then unnecessarily attenuates the reverse power level. The CMTS blade 320a-n now receives the reverse subcarrier signal and detects a 5 dBmV in the power level, which is an unacceptable level.

Figure 6:
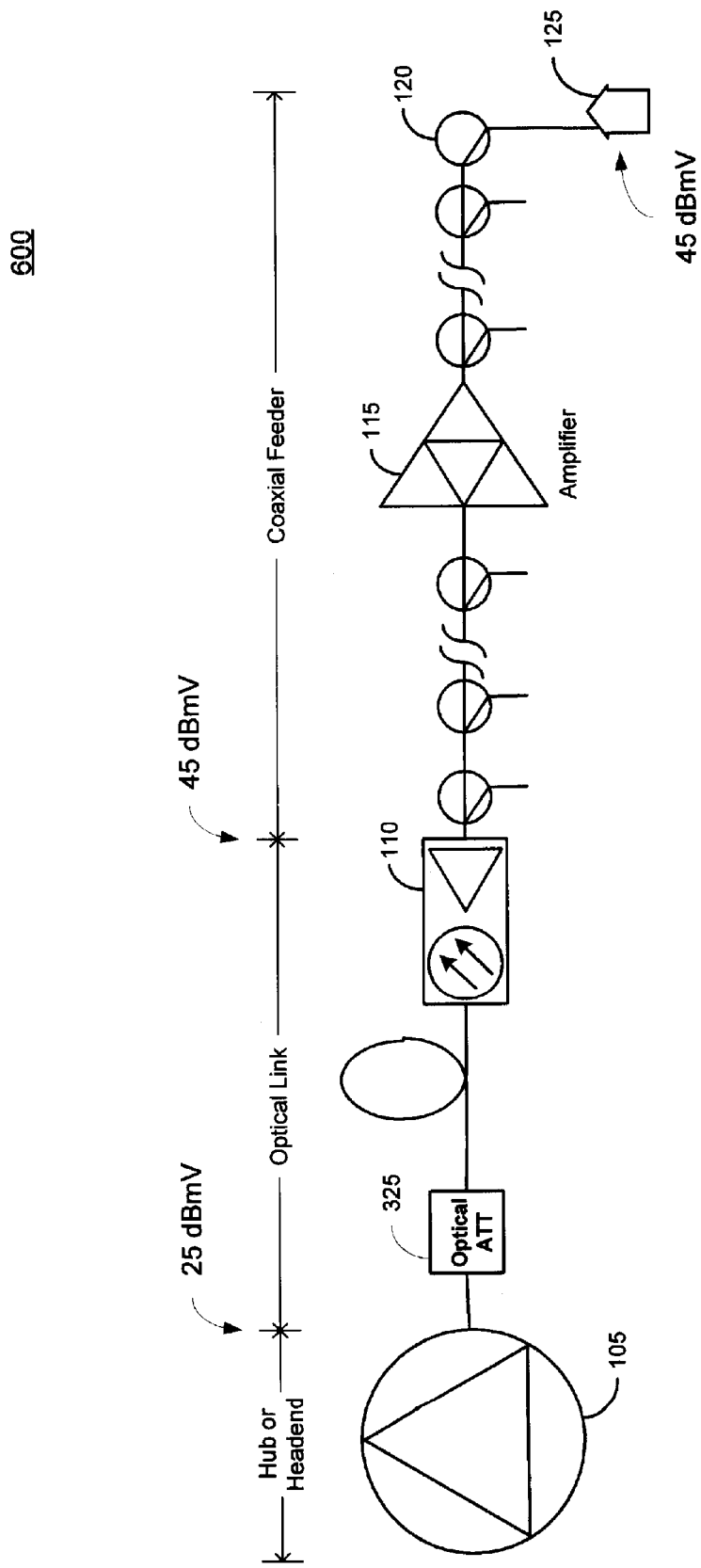
FIG. 6 illustrates a simplified block diagram of a system link 600 that adjusts the attenuated power level of the reverse subcarrier signal of FIG. 5.

FIG. 6 illustrates a simplified block diagram of a system link 600 that adjusts the attenuated power level of the reverse subcarrier signal of FIG. 5. As designed, the CMTS blade 320a-d sends a control signal to the transmitter of the CPE 125 to adjust the power level. In this example, the power level should be increased by 20 dBmV to overcome the 20 dB optical attenuator 325. Accordingly, the CPE 125 now transmits reverse subcarrier signals at an increased power level of 45 dBmV. The increased power level is then received at the optical node 110 where it is processed and transmitted to the CMTS blade 320a-d. The CMTS blade 320a-d receives the reverse subcarrier signal at a power level of 25 dBmV and is satisfied with the adjusted power level. Unfortunately, however, the increased power level at the optical node 110 does not fall within the designed dynamic range of the optical link. In this manner, the optical transmitter 230 within the optical node 110 may begin clipping the reverse subcarrier signal due to the increased power level. Disadvantageously, increasing the power level of the reverse signal also increases the ingress signals, and the clipping may also result in lost subcarrier signals.

Figure 7:
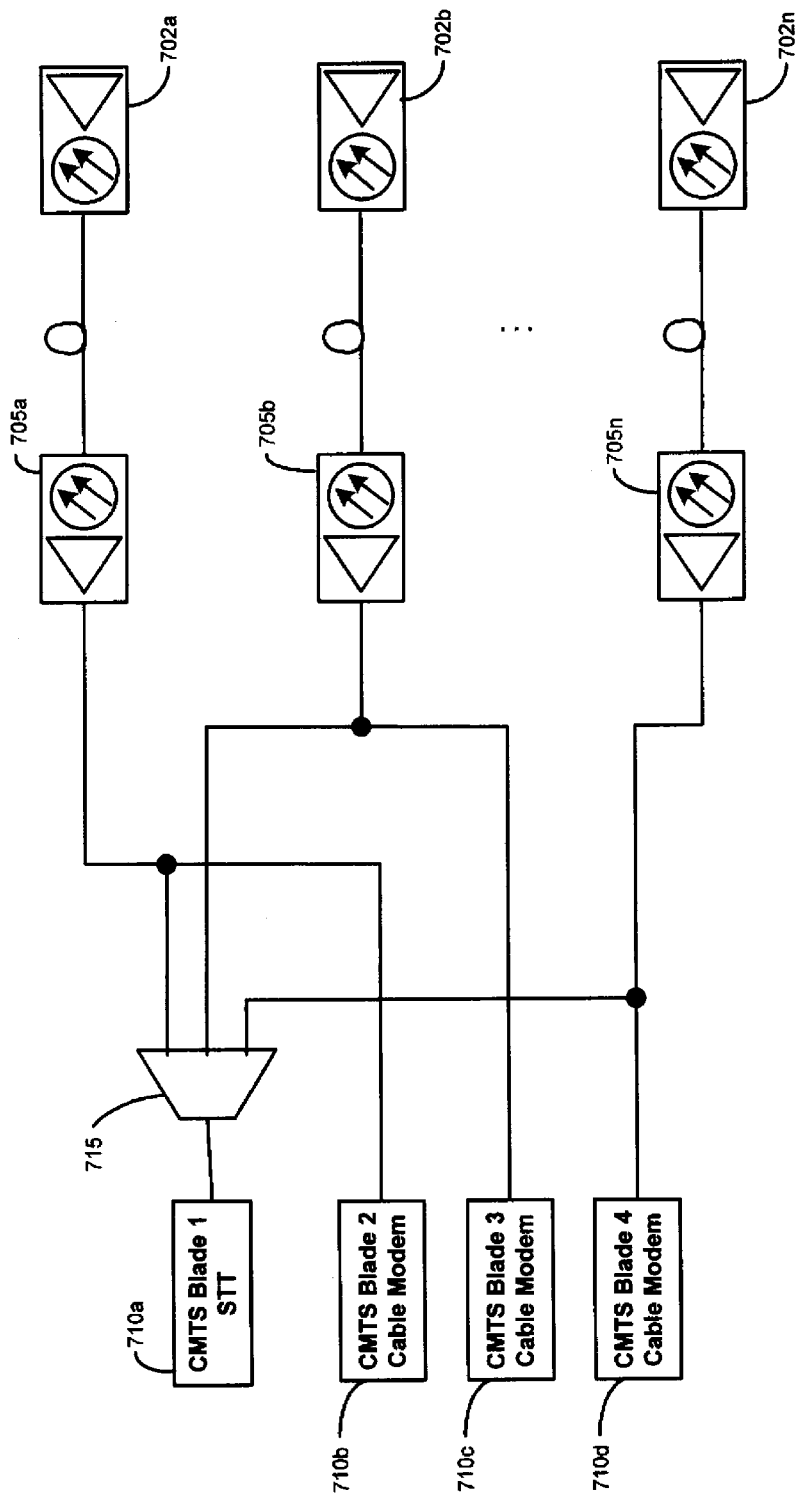
FIG. 7 illustrates a simplified block diagram of a plurality of optical links in accordance with the present invention that overcomes the disadvantages of the CMTS blade 320a-d inadvertently adjusting the power level of reverse subcarrier signals.

FIG. 7 illustrates a simplified block diagram of a plurality of optical links in accordance with the present invention that overcomes the disadvantages of the CMTS blade 320a-d inadvertently adjusting the power level of reverse subcarrier signals. An optical node 702, which includes an A/D converter, transmits reverse digital subcarrier signals to a digital optical receiver 705. Importantly, instead of converting the reverse signals into analog signals, however, the digital optical receiver 705 converts the optical signals to electrical signals and transmits the electrical signals in the digital domain. The digital electrical signals are then bussed around the headend in a digital format instead of routed through RF splitters 310a-a-n and combiners 315 as shown in FIG. 3. Any signal combining from the multiple optical receivers 705 is done by a digital combiner 715 rather than conventional RF analog combining. Advantageously, the previously-required attenuators 325a-n, 330a-n at the input and output of the optical receiver 305a-n and at the input of the CMTS blades 320a-d are no longer necessary since the level is set at the input of the optical transmitter 702 and remains constant. More specifically, without the optical attenuators 325a-n, 330a-n, 335a-d and RF splitters 310a-n and combiner 315 there is very minimal loss or ingress in the optical link. Additionally, a CMTS blade 710a-d, or any other digital demodulator, no longer requires the A/D converter since the incoming signals are in the digital domain, thereby saving manufacturing costs. It will be appreciated, however, that the digital optical transmitter 705a-n can include a D/A converter to convert any signals to an analog format in the cases where a CMTS requires an analog signal.

Figure 8:
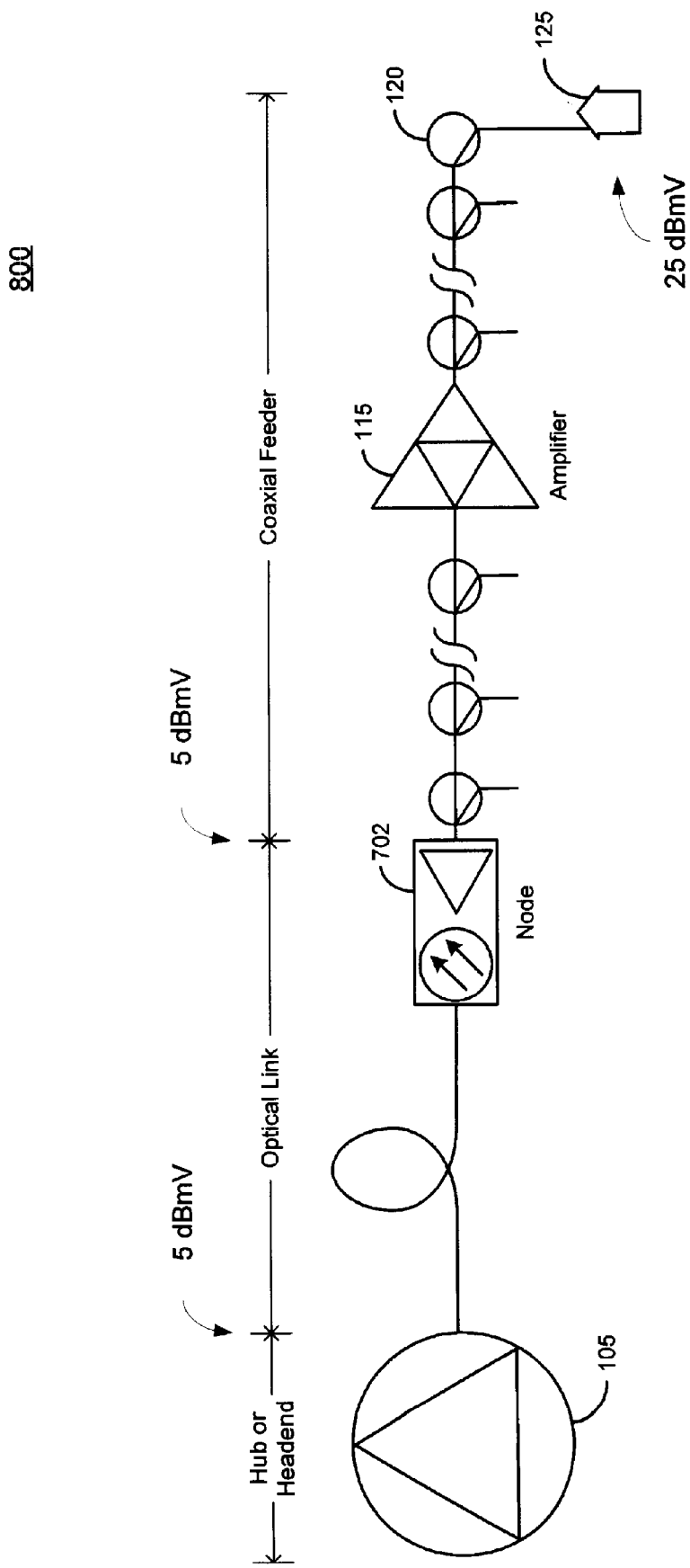
FIG. 8 illustrates a simplified block diagram of a system link 800 that is attenuating the power level of the reverse subcarrier signal.

FIG. 8 illustrates a simplified block diagram of a system link 800 that is attenuating the power level of the reverse subcarrier signal. In this example, a transmitter in the CPE 125 transmits reverse subcarrier signals with a power level of 25 dBmV. Various components in the coaxial feeder portion of the link 800, however, attenuate the power level by 20 dB. The optical node 702 receives the reverse subcarrier signal and using an A/D converter converts the signals into a digital subcarrier signal having an attenuated power level. The digital subcarrier signals are then transmitted to the CMTS blade 710a-d included in the headend 105.

Figure 9:
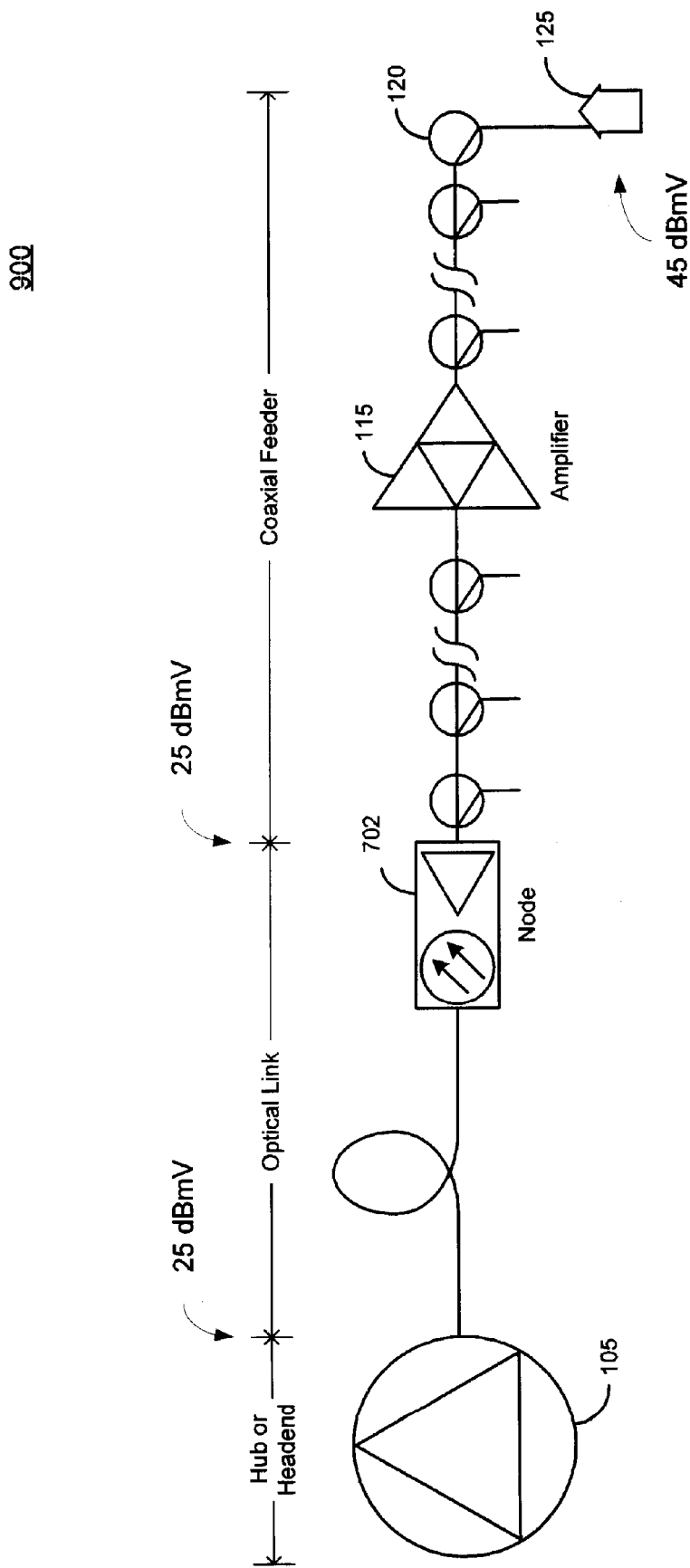
FIG. 9 illustrates a simplified block diagram of a system link 900 that adjusts the attenuated power level of the reverse subcarrier signal of FIG. 8.

FIG. 9 illustrates a simplified block diagram of a system link 900 that adjusts the attenuated power level of the reverse subcarrier signal of FIG. 8. In accordance with the present invention, the CMTS blade 710a-d correctly adjusts the power level of the reverse subcarrier signal by sending a control signal to the CPE 125. In this manner, the transmitter of the CPE 125 increases the power level by 20 dBmV. Since the components in the coaxial feeder portion of the network have not changed, the power level of the reverse subcarrier signal is attenuated so that a power level of 25 dBmV is seen at the input of the optical node 702. Accordingly, the reverse transmitter of the optical node 702 converts the digital signal into an optical signal that is well within the dynamic range of the optical link, thereby avoiding clipping of the subcarrier signal as well as acceptable ingress levels. Advantageously, the link 900 gives a more accurate measure and control of the RF subcarrier power levels at the input of the optical link where it has the most significant effect on the system performance.

Figure 10:
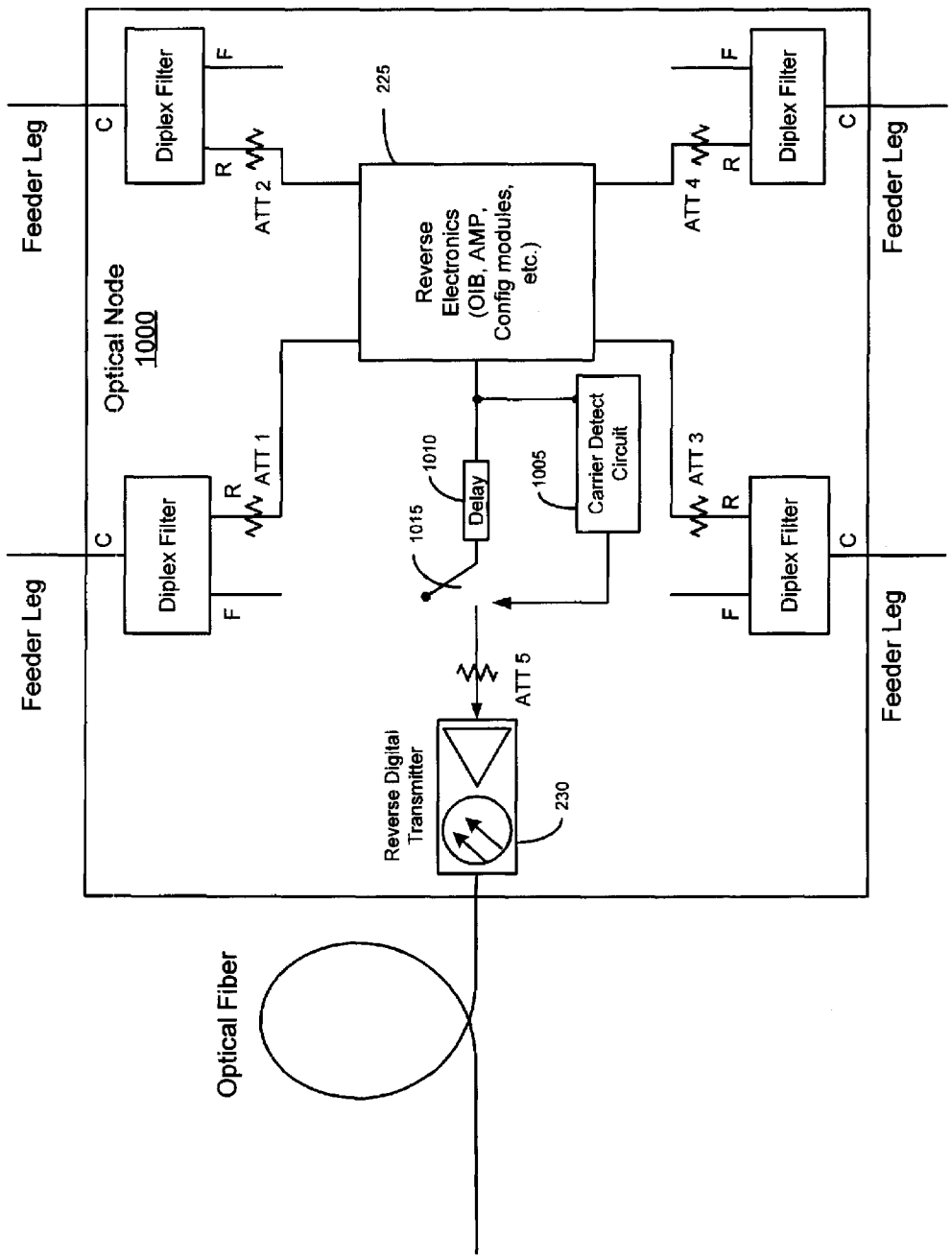
FIG. 10 illustrates a baseband digital reverse optical node that is suitable for use in the link of FIGS. 8 and 9.

As mentioned, reverse transmitters in an optical node are traditionally always transmitting reverse signals (i.e., reverse subcarrier signals and ingress signals). It will be appreciated that reverse signals can be transmitted in the optical link only when a reverse subcarrier signal is present at the optical node 702, thereby controlling ingress and noise that funnel up through the plurality of coaxial feeder portions of the link. FIG. 10 illustrates a baseband digital reverse optical node that is suitable for use in the link of FIGS. 8 and 9. A carrier detect circuit 1005 detects a reverse digital subcarrier signal from the output of the reverse electronics 225. An optional delay circuit 1010 may delay the reverse subcarrier signals to ensure that a switch 1015 is timely closed so that the reverse subcarrier signals are not lost. The reverse digital transmitter 230 then converts the electrical digital subcarrier signals into optical subcarrier signals for transmission to the digital optical receiver 705a-n. In this manner, ingress signals are not constantly transmitted through the optical link until such time as a reverse subcarrier signal is present, thereby also positively affecting system performance.

Accordingly, systems and methods have been described that move the control and level adjusting of the reverse subcarrier signal at the input of the optical link as opposed to at the CMTS. It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and protected by the following claims.

The invention claimed is:

1. A method for adjusting the power level of reverse subcarrier signals, the method comprising the steps of:
   receiving an analog electrical subcarrier signal at an optical node, the analog electrical subcarrier signal having a desired power level;
   converting the analog electrical subcarrier signal into a digital optical subcarrier for transmission on an optical link;
   receiving the digital optical subcarrier signal at an optical receiver upstream from the optical node;
   converting the digital optical subcarrier signal into a digital electrical subcarrier signal;
   receiving the digital electrical subcarrier signal at a CMTS blade;
   detecting a power level of the digital electrical subcarrier signal at the CMTS blade, wherein the detected power level of the digital electrical subcarrier signal is equivalent to the desired power level of the analog electrical subcarrier signal received at the optical node; and
   depending on the detected power level, transmitting a control signal to one of amplify or attenuate the power level of the analog electrical subcarrier signal, such that clipping is mitigated at the optical node.

2. The method of claim 1, wherein customer premise equipment provides the analog electrical subcarrier signal to the optical node and receives the control signal.

3. The method of claim 1, further comprising the steps of:
   receiving a plurality of digital optical subcarrier signals from a plurality of optical receivers;
   routing the plurality of digital optical subcarrier signals to an appropriate one of a plurality of CMTS blades.

4. A method for adjusting the power level of reverse subcarrier signals, the method comprising the steps of:
   transmitting a subcarrier signal having a desired power level at an upstream output of an optical node;
   receiving the subcarrier signal at a CMTS blade;
   detecting a power level of the subcarrier signal at the CMTS blade, wherein the power level is equivalent to the desired power level at the upstream output of the optical node;
   depending on the detected power level, transmitting a control signal to one of amplify or attenuate the power level;
   receiving an electrical subcarrier signal having a power level at an upstream input of the optical node, the electrical subcarrier signal being provided by customer premise equipment;
   digitizing the electrical subcarrier signal;

attenuating the digital subcarrier signal in accordance with the desired power level at the upstream output of the optical node; and converting the digital subcarrier signal into a digital optical subcarrier signal.

5. A method for adjusting a power level of reverse subcarrier signals, the method comprising the steps of:

at an optical node, receiving an electrical subcarrier signal having a power level at an input of the optical node;

digitizing the electrical subcarrier signal; and converting the digital subcarrier signal into a digital optical subcarrier signal; and at an optical receiver, receiving the digital optical subcarrier signal;

converting the digital optical subcarrier signal into a digital electrical subcarrier signal; and providing the digital electrical subcarrier signal to a CMTS blade, wherein the power level of the digital optical subcarrier signal is equivalent to the power level of the digital electrical subcarrier signal.

6. The method of claim 5, further comprising the steps of:

at the CMTS blade, detecting the power level of the digital electrical subcarrier signal; and depending on the detected power level, transmitting a control signal to one of amplify or attenuate the power level.

7. The method of claim 6, further comprising the steps of:

at a CPE, receiving the control signal; and adjusting a power level of a transmitter; and transmitting further electrical subcarrier signals having the adjusted power level.

8. A communication system for transmitting reverse subcarrier signals, the communications system comprising:

a plurality of CPE equipment each for transmitting reverse electrical signals having a CPE transmitter power level;

an optical node for receiving the reverse electrical signals, and for providing a combined digital optical signal having a transmitter power level;

an optical receiver for receiving the combined digital optical signal, and for providing a combined digital electrical signal; and a CMTS blade for receiving the combined digital electrical signal, and for detecting the transmitter power level of the combined digital electrical signal, wherein, depending upon the detected power level, transmitting a control signal to one of amplify or attenuate the CPE transmitter power level.

9. The communications system of claim 8, wherein the communications system includes components coupled between the plurality of CPE equipment and the optical node, wherein the components attenuate the CPE transmitter power level of the reverse electrical signals.

10. The communications system of claim 8, wherein the CMTS blade detects and adjusts the CPE transmitter power level based on a power level received at an input of the optical node.

11. The communications system of claim 8, wherein, since the reverse electrical signals are transmitted in a digital format after the optical node, the transmitter power level remains constant throughout the communications system.

12. A communications system for adjusting power levels of reverse subcarrier signals, the communications system including an optical link and an RF feeder portion, the communication system comprising:

a CMTS blade for receiving a digital electrical signal and for detecting a power level of the digital electrical signal, and for transmitting a control signal to one of amplify or attenuate the power level;

an optical node for receiving an analog electrical signal from each of a plurality of CPES, and for providing a digital optical signal, wherein each received analog electrical signal has a transmitter power level based on the control signal; and an optical receiver for receiving the digital optical signal and for providing the digital electrical signal to the CMTS blade;

wherein the power level of the digital electrical signal detected by the CTMS blade is substantially equivalent to the power level of a given analog electrical signal received at the optical node.

13. A communications system for adjusting power levels of reverse subcarrier signals, the communications system including an optical link and an RF feeder portion, the communication system comprising:

a CMTS blade for receiving a digital electrical signal and for detecting a power level of the digital electrical signal, and for transmitting a control signal to one of amplify or attenuate the power level, wherein the power level of the digital electrical signal is affected by the RF feeder portion of the communications system;

a plurality of CPE each for transmitting an electrical signal having a CPE transmitter power level, and each for receiving the control signal to one of amplify or attenuate the CPE transmitter power level;

an optical node coupled to the plurality of CPE for receiving the electrical signal, and for providing a digital optical signal having an optical transmitter power level; and an optical receiver for receiving the digital optical signal and for providing the digital electrical signal having the optical transmitter power level to the CMTS blade, wherein the optical transmitter power level remains constant from an output of the optical node to an input of the CMTS blade.

* * * * *